United States Patent [19]
Suzuki

[11] Patent Number: 5,887,034
[45] Date of Patent: Mar. 23, 1999

[54] DS-CDMA MULTIPLE USER SERIAL INTERFERENCE CANCELER UNIT AND METHOD OF TRANSMITTING INTERFERENCE REPLICA SIGNAL OF THE SAME

[75] Inventor: Hideto Suzuki, Tokyo, Japan

[73] Assignee: NEC Corporation, Japan

[21] Appl. No.: 827,300

[22] Filed: Mar. 28, 1997

[30] Foreign Application Priority Data

Mar. 29, 1996 [JP] Japan .................................... 8-076029
Mar. 29, 1996 [JP] Japan .................................... 8-076150

[51] Int. Cl.$^6$ ................................................. H04B 15/00
[52] U.S. Cl. ......................... 375/285; 375/206; 375/260; 375/296; 370/335
[58] Field of Search .................................... 375/260, 201, 375/206, 255, 296, 346; 370/335, 342

[56] References Cited

U.S. PATENT DOCUMENTS

| | | | |
|---|---|---|---|
| 5,363,403 | 11/1994 | Schilling et al. | 370/441 |
| 5,444,864 | 8/1995 | Smith | 455/84 |
| 5,467,368 | 11/1995 | Takeuchi et al. | 375/206 |
| 5,579,304 | 11/1996 | Sugimoto et al. | 375/205 |
| 5,719,852 | 5/1996 | Schilling et al. | 375/346 |

OTHER PUBLICATIONS

Mamoru Sawahashi, et al., "Serial Canceler Using Recursive Channel Estimation by Pilot Symbols for DS–CDMA", Technical Report of IEICE, SAT95–14, RCS95–50(1995–07), pp. 43–48.

*Primary Examiner*—Chi H. Pham
*Assistant Examiner*—Emmanuel Bayard
*Attorney, Agent, or Firm*—Ostrolenk, Faber, Gerb & Soffen, LLP

[57] ABSTRACT

A sum of interference replica signals of other user that have been generated and synthesized is transmitted to each user at each stage. An interference replica signal of a present user generated at a stage previous to a present stage is subtracted from the synthesized replica signal. The remained interference replica signal is subtracted from the received signal, thus cancelling the interference generated by other user.

19 Claims, 3 Drawing Sheets

DS-CDMA MULTIPLE USER SERIAL INTERFERENCE CANCELER UNIT AND METHOD OF TRANSMITTING INTERFERENCE REPLICA SIGNAL OF THE SAME

BACKGROUND OF THE INVENTION

The present invention relates to a DS-CDMA multiple user serial interference canceler and, more particularly to a method of transmitting an interference replica signal.

Conventionally a multiple user serial interference canceler has been proposed for reducing interference within a cell of a DS-CDMA. In the above multiple user serial interference canceler, an interference replica signal of a user (other than a user k) ($1 \leq k \leq K$) that has been demodulated previous to demodulation of the user k is generated. The generated interference replica signal is subtracted from the received signal and this process is repeated N times (N: natural number $\geq 1$, representing the number of stages) so that influence owing to other user's interference can be reduced.

In a usual manner to transmit the interference replica signal of other user, a bus line that can be shared and accessed by all panels is provided so that the interference replica signal from each panel is notified and synthesized with that of other panel. FIG. 3 is an example of a construction of a conventional interference canceler for the interference replica transmission through the common bus line. A reference numeral 31 is a received signal, 32 is a common bus line for interference replica transmission, 33 is an interference canceler unit (including decoder), 34 is a delay memory for matching timing between the received signal and the interference replica signal, 35 is a subtractor for subtracting the interference replica signal from the received signal, 36 is a processor for synthesizing the interference replica signal of other user, and 37 is a decoder. The common bus line 32 is connected to all users at all stages so that the interference replica signal generated by each user at each stage is transmitted to other users. Each user synthesizes the transmitted interference replica in the processor 36, which is subjected to interference cancellation through subtraction from the received signal in the subtractor 35. The resultant signal is transmitted to the interference canceler unit (hereinafter referred to as an ICU) 33. The decoder 37 at the last stage (third stage in FIG. 3) outputs the final decoding result. The parameter defining the transmission rate of the signal running through the common bus line 32 is spreading chip rate, n sampling times, K users and N stages. The transmission rate obtained by (spreading chip rate ×n sampling times ×K user ×N stage) is required.

In a conventional method, the common bus line is used to send the interference replica signal of each user to all users other than the present user. In the above method, a signal at a transmission rate K×N times higher than that of the interference replica signal equivalent to one user runs through the common bus line. For example, assuming that the transmission rate of the interference replica signal is 120 Mbps, the number of users is 16 and the number of stages is 3, respectively, the transmission rate required for the common bus line becomes 5.76 Gbps. Therefore it is practically difficult to design the circuit conforming to the above condition.

In the above-described prior art, as generation of the interference replica signal proceeds to the latter phase (the number of ICU#1-K increases), the delay is accumulated. As a result, the received signal delay holder memory D for delaying and holding the received signal has to be increased. The whole system, thus, becomes unnecessarily large.

SUMMARY OF THE INVENTION

An objective of the present invention is to provide a method of transmitting an interference replica signal of a DS-CDMA multiple user serial interference canceler in which the transmission rate at which the interference replica signal of other user is transmitted to each user is decreased so as to facilitate system construction.

Another objective of the present invention is to provide a DS-CDMA multiple user serial interference canceler in which the size of the received signal memory is kept compact in the latter phase of processing, allowing for easy system construction.

The above objective of the present invention is achieved by a method of transmitting an interference replica signal of a DS-CDMA multiple user serial interference canceler unit comprising 1st to Nth stages (N: natural number $\geq 2$) each provided with K interference cancel units (K: natural number $\geq 1$), in which a sum of synthesized interference replica signals of a user that have been previously generated is transmitted to each user at each stage; an interference replica signal of a present user generated at a stage previous to a present stage is subtracted from the synthesized interference replica signal; and a remained interference replica signal is subtracted from a received signal so that an interference component generated by other user is removed(cancelled) and input to an interference cancel unit of a present user.

The another objective of the present invention is achieved by a method of transmitting an interference replica signal of a DS-CDMA multiple user serial interference canceler unit provided with 1st to Nth stages (N: natural number $\geq 2$) each provided with K units (K natural number $\geq 1$) of interference replica signal generation means for generating an interference replica signal based on a received signal at each stage comprising steps of: transmitting a signal S' obtained by subtracting a sum of interference replica signals at nth stage from a recption signal to (n+1)th stage from a kth user at the nth ($1 \leq n \leq N$) stage; transmitting an interference replica signal generated by each interference replica signal generation means at the nth stage to a corresponding user at the (n+1)th stage; generating a signal S by adding the interference replica signal transmitted from kth user at the mth stage to a signal S' transmitted from (k−1)th user at the (n+1)th stage in the kth ($1 \leq k \leq K$) user at the (n+1)th stage and further generating an interference replica signal by interference replica signal generation means based on the signal S; and generating a signal S' by subtracting the generated interference replica signal from the signal S in kth ($1 \leq k \leq K$) user at the (n+1)th stage and transmitting the generated signal S' to (k+1)th user at the (n+1)th stage.

The objective of the present invention is achieved by a DS-CDMA multiple user serial interference canceler unit provided with 1st to Nth (N: natural number $\geq 2$) stages comprising: K (K: natural number $\geq 1$) interference cancel units provided at each stage; a first subtractor provided for each interference cancel unit at the second and subsequent stages that subtracts an interference replica signal output from an interference cancel unit of a present user at a previous stage from a sum of interference replica signals of a previous processing phase; a second subtractor provided at an input side of each interference cancel unit at each stage exclusive of a first interference canceler unit at a first stage that subtracts an interference replica signal output from an interference cancel unit of a previous user or an interference replica signal output from the first subtractor from a received signal for outputting to the interference cancel unit; and an adder provided at an output side of each interference cancel unit at each stage exclusive of a first interference canceler unit at a first stage that adds an output of an interference cancel unit to a sum of interference replica signals of a previous processing phase.

The other objective of the present invention is achieved by a DS-CDMA multiple user serial interference canceler unit provided with 1st to Nth (N: natural number $\geq 2$) stages comprising a first transmission line on which a signal obtained by subtracting a sum of each interference replica signal at 1 stage from a received signal is transmitted from nth ($1 \leq n \leq N$) stage to (n+1)th stage in which a kth user at a first stage comprising interference replica signal generation means for generating an interference replica signal; and a subtractor provided at an output side of the interference replica signal generation means and outputs a signal obtained by subtracting an interference replica signal generated by the interference replica signal generation means from a signal obtained by subtracting a sum of each interference replica signal up to previous users from a receive signal to interference replica signal generation means of (k+1)th user; a kth user at nth ($1 \leq n \leq N$) stage comprising interference replica signal generation means for generating an interference replica signal; a second transmission line on which an interference replica signal generated by interference replica signal generation means of kth user at (k−1)th stage is transmitted; adder means for adding an interference replica signal transmitted on the second transmission line to a signal obtained by subtracting a sum of each interference replica signal at 1 stage from a received signal; and a subtractor for outputting a signal obtained by subtracting an interference replica signal generated by the interference replica signal generation means from an output of the adder means to interference replica signal generation means of (k+1)th user.

The present invention uses no common bus line for transmission of other user's signal required for canceling interference. Instead the signal is transmitted through a parallel bus line or the like connecting adjacent users for successive processing and transferring the sum. The interference signal component of a present user is transferred and subtracted through a different transmission line. As a result, the signal can be transmitted practically in good condition without changing the principle on interference canceling operation, thus facilitating system construction. Also in the present invention, a signal containing the received signal that should be interference removed is first input by a first user at a first stage and then transmitted sequentially to subsequent phases. So the received signal does not have to be held by the respective users through a different line. Therefore a size of the memory for holding the reception signal in the latter stages of processing does not have to be increased, thus facilitating construction of the system without changing the principle on the interference cancel operation.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
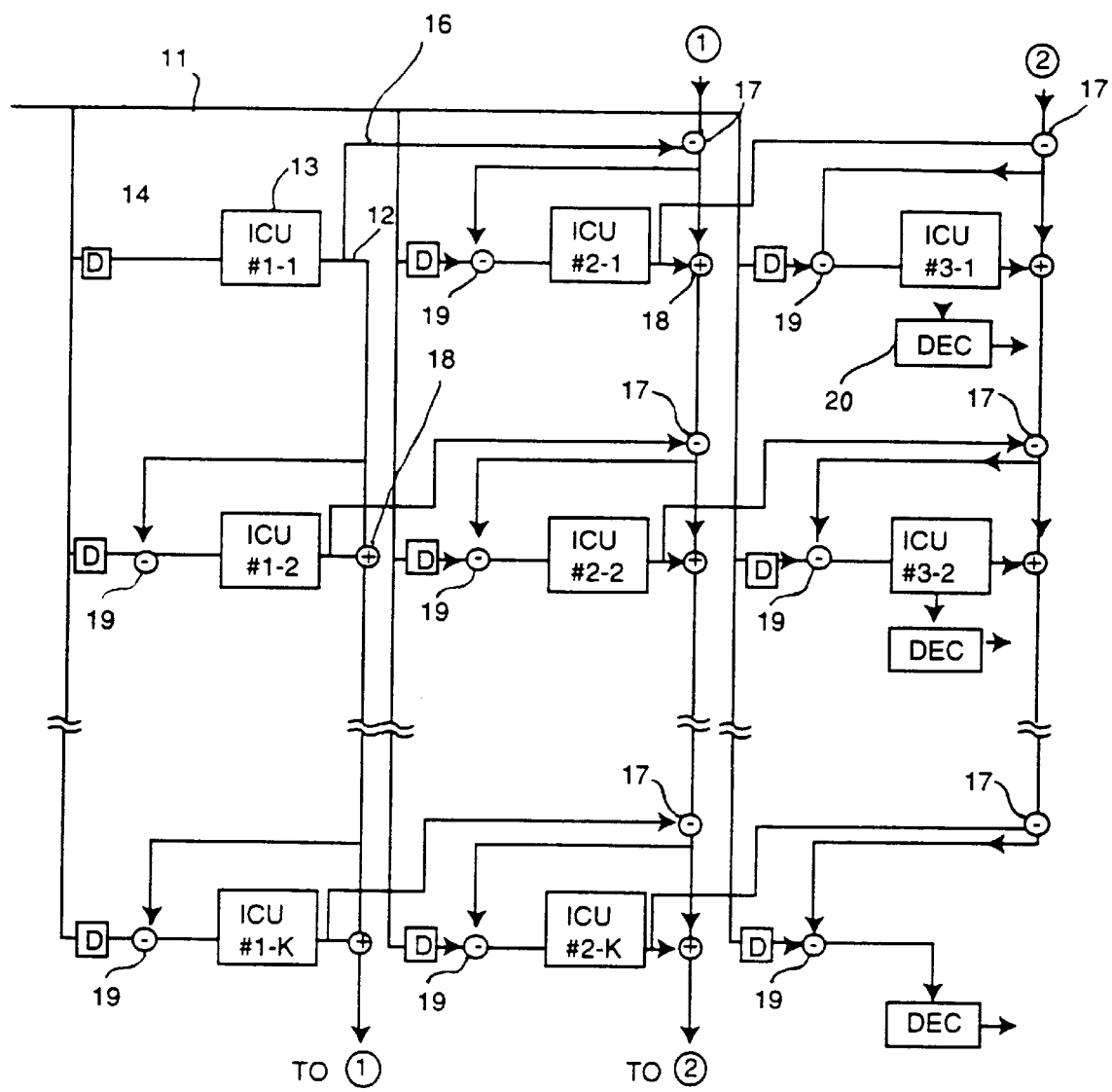
FIG. 1 is a view for explaining a method of transmitting an interference replica signal of an interference canceler of the present invention.

Next a first embodiment of the present invention is described in detail referring to the drawings. FIG. 1 shows an interference canceler of the present invention. A reference numeral 11 is a received signal transmission line, 12 is an interference replica signal transmission line for transmitting the interference replica signal to the adjacent user, 13 is an interference cancel unit (hereinafter referred to as ICU), 14 is a delay memory, 16 is an interference replica signal transmission line for transmitting the interference replica signal of each user at the nth stage to the present user at the next stage (the (n+1)th stage), 17 is a subtractor for subtracting the interference replica signal of the present user at a previous stage from the interference replica signal that has been transmitted in a form of a signal indicating the sum of each user's signals, 18 is an adder for synthesizing the present user's signal to the synthesized interference replica signal up to the previous user, 19 is a subtractor for subtracting the interference replica signal output by the previous user, and 20 is a decoder.

Each user at each stage removes the signal component of the present user at the previous stage from the interference replica signal that has been previously generated. By subtracting the remaining synthetic interference replica signal from the received signal, the interference component of the interference replica signal can be cancelled. In the present invention, the interference replica signal of each user is not transmitted through the common bus line. The interference replica signal is transmitted through a parallel bus line or the line directly connecting adjacent users at each stage. Immediately after the processing, the interference replica signal is transmitted to the next user sequentially. Interference replica signals of a plurality of users are not directly transmitted. The signal as the sum of the interference replica signals that have been generated is transmitted so as to reduce the transmission rate.

Next the operation of the embodiment of the present invention is described referring to FIG. 1. In the ICU13 (in this embodiment, ICU#1-1, ICU#1-2, . . . ICU#1-K) of each user at the first stage, an interference replica signal generated by the ICU#1-1 is transmitted to the next adjacent ICU#1-2. The interference replica signal is further transmitted to the next adjacent ICU#1-3 together with the interference replica signal generated by the ICU#1-2. Similar processing is continued to the last ICU#1-K at the stage. The sum of the interference replica signals generated by the ICU#1-1, ICU#1-2, . . . and ICU#1-K is transmitted to the next stage. Concurrently the interference replica signal generated by the ICU13 of each user is transmitted to the subtractor 17 connected to each interference cancel unit 13 (in this embodiment, #2-1 #2-2, . . . #2-K) corresponding to the present user at the next stage (the second stage) through the transmission line 16. The transmission lines 12 and 16, can be any medium means allowing for high rate transmission, such as direct connection of parallel bus, direct connection of serial bus, optical fiber cable, twisted wiring or the like can be used.

The ICU13 of each user at the second stage (ICU#2-1, ICU#2-2, . . . ICU#2-K) is described with respect to the ICU#2-2. A signal input to the ICU#2-1 is a signal obtained by subtracting an interference replica signal generated by the ICU#1-1 from the sum of the interference replica signals generated by the respective ICU13 (ICU#1-1, ICU#1-2, . . . ICU#1-K) at the previous stage, i.e., first stage and further subtracting the remaining signal from a received signal. A signal output from the ICU#2-1 is the interference replica signal generated by the ICU#2-1. A signal input to the ICU#2-2 is a signal obtained by subtracting the interference replica signals generated by ICU#1-1 and ICU#1-2 from the sum of the interference replica signals generated by the respective ICU13 at the previous stage, i.e., first stage (ICU#1-1, ICU#1-2 ICU#1-k) and further subtracting the remaining signal from the received signal. The signal output from the ICU#2-2 is the interference replica signal generated by the ICU#2-2. As described above, similar signal processing is executed in the ICU13 at the adjacent subsequent phases. The adder 18 connected to the last ICU#1-K at the second stage transmits the sum of the interference replica signals generated by the respective ICU13 at the second stage to the next stage, i.e., third stage.

At the third stage, the signal is input to the interference cancel unit (#3-1, #3-2) in the same manner as described above. The decoder 19 provides the final decoding result.

In this method, the transmission rate of the interference replica signal transferred to each user becomes the same (n sampling times the spreading chip rate) as that of the interference replica signal for one user no matter how the number of the user K and the number of stages N are increased. The transmission rate of the signal transmitted through the transmission line 12 is the same as that of the interference replica signal of one user (spreading chip rate×n sampling times). Therefore the transmission rate is 1/(K×I) of that of the prior art, leading to easy circuit construction.

The present invention reduces data transmission rate between panels. As a result, data can be transferred at practically high rate, facilitating construction of the unit.

Figure 2:
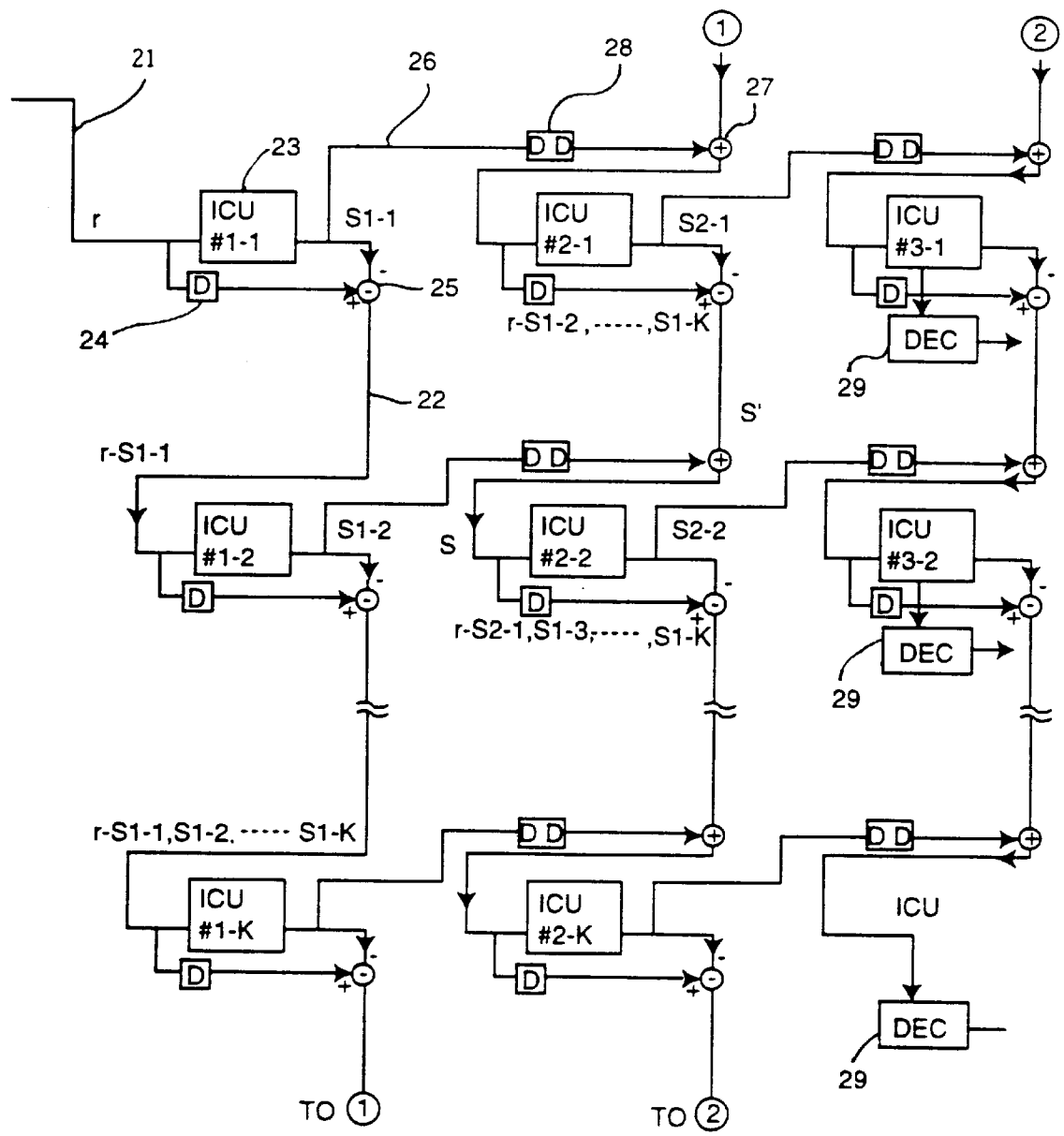
FIG. 2 is a view showing an embodiment of an interference canceler unit of the present invention.
Figure 3:
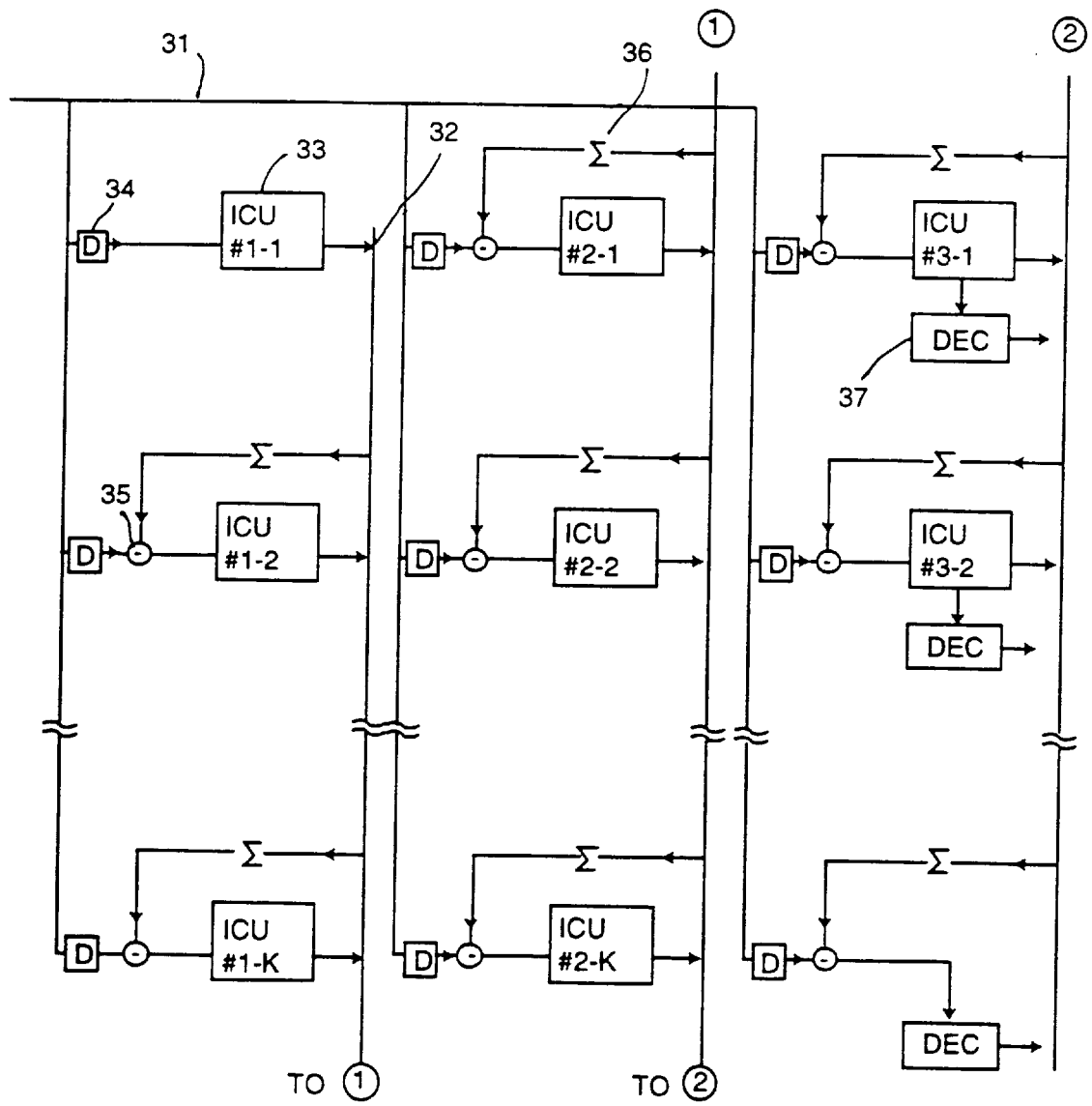
FIG. 3 is a view for explaining a method of transmitting an interference replica signal of an interference canceler of the prior art.

Conventionally the interference replica signal is transmitted as a sum of bit amount of the interference replica signals generated by each ICU. As the present invention uses the adder, transmission can be executed at the same or slightly more bit amount compared with the bit amount of the interference replica signal generated by a single ICU. Next a second embodiment of the present invention is described in detail referring to the drawings. FIG. 2 shows an interference cancel unit of the present invention. A reference numeral 21 is a reception signal, 22 is a received signal transmission line for transmitting the interference cancelled received signal to an adjacent panel, 23 is an interference cancel unit, 24 is a delay holder memory for delaying and holding the received signal (shown as D in FIG. 2), 25 is a subtractor, 26 is an interference replica signal transmission line for transmitting the interference replica signal of each user to a present user at the next stage, 27 is an adder for adding a(n) (interference) replica signal of the present user at a previous stage, 28 is a delay holder memory for delaying and holding the present user's interference replica signal at the previous stage (shown as DD in FIG. 2 ) and 29 is a decoder for executing final decoding.

An operation of the interference canceler unit of the embodiment according to the present invention is briefly described. A kth user at the nth stage receives an input of a signal obtained by subtracting an interference replica signal that has been previously generated from the received signal and further generates a new interference replica signal of the kth user for outputting. The input signal is allowed to delay for a period equivalent to processing of one user. The interference replica signal generated by the kth user is subtracted from the input signal, which is transmitted to the next user, i.e., the (k+1)th user at the nth stage. As the interference replica signal of the (k+1)th user generated at the stage has been already subtracted from the transmitted signal, the signal at a previous stage where another line transmission is executed, i.e., the signal of the (k+1)th user at the (n−1) stage, is added before inputting to the next ICU for removing the signal. Then the signal is input to the ICU23 of the (k+1)th user. In this method, the signal containing the received signal that has been first input to the first user at the first stage is transmitted sequentially to the subsequent phases. The received signal, thus, does not have to be held by each user through a different line, resulting in preventing the memory for holding the received signal from being enlarged in the latter phase of processing.

Referring to FIG. 2, the above operation is further described. A reception signal r is first input to the ICU#1-1 of the first user at the first stage. An interference replica signal $S_{1,1}$ is generated and output. While the thus generated interference replica signal $S_{1,1}$ is subtracted from the receive signal r. That is the signal $r-S_{1,1}$ is transmitted to the ICU#1-2 of the next user, i.e., the second user at the first stage. The adder 27 connected to the ICU#n-k (not shown) of the kth user at the n (n: natural number $\geq$1)th stage receives the signal as shown in the following [number 1].

$$r-S_{n,1}-S_{n,2}-\ldots-S_{n,k-1}-S_{n-1,k}-S_{n-1,k+1}\ldots-S_{n-1,K} \quad \text{[Number 1]}$$

As the above [Number 1] shows, the receive signal r is always contained. So the receive signal does not have to be transmitted and held through a different line. The interference replica signal $S_{n-1,k}$ generated by the ICU23 of a present user at a previous stage transmitted through the interference replica signal transmission line can be added to the signal shown in the [Number 1] and input to the ICU23 of the present user at the stage. At a final stage, the decoder 29 set for each user provides the final decoding result.

The above method eliminates the delay holder memory for holding the reception signal at an initial phase of the processing of each user at each stage. While this method requires the memory for holding the interference replica signal from the present user at the previous stage for a size equivalent to one stage. However the size of the memory requires only 1/N (N: number of stage) of the capacity irrespective of the number of the stage of the system compared with the conventional art. Therefore the circuit can be easily constructed.

The present invention eliminates the memory for holding the reception signal, thus facilitating construction of the system.

The entire disclosure of Japanese Patent Application No. 8-076029 filed on Mar. 29, 1996 and Japanese Patent Application No. 8-076150 filed on Mar. 29, 1996 including specification, claims, drawing and summary are incorporated herein by reference in its entirety.

What is claimed is:

1. A method of transmitting an interference replica signal of a DS-CDMA multiple user serial interference canceler unit comprising 1st to Nth stages (N: natural number $\geq$2) each provided with K interference cancel units (K: natural number $\geq$1), the method comprising the steps of:

transmitting to each user at each said stage a sum of synthesized interference replica signals of a user that has been previously generated;

subtracting from said synthesized interference replica signal an interference replica signal of a present user generated at a stage previous to a present stage; and subtracting a remaining interference replica signal from a receive signal so that an interference generated by other users is cancelled and input to an interference cancel unit of a present user.

2. A method of transmitting an interference replica signal of a DS-CDMA multiple user serial interference canceler unit including 1st to Nth stages (N: natural number $\geq 2$), the method comprising the steps of:

transmitting a sum of interference replica signals of each user that has been generated at previous stages to an nth ($1 \leq n \geq N$) stage to a user at said nth stage;

subtracting an interference replica signal of a present user generated at an (n−1) stage and a received signal from said sum of interference replica signals for each user; and cancelling an interference generated by other users based on said subtracted interference replica signal.

3. The method of transmitting an interference replica signal of a DS-CDMA multiple user serial interference canceler unit of claim 2, further comprising a step of: adding an interference replica signal of each user at nth stage ($1 \leq n \leq N$) sequentially and transmitting a sum of said interference replica signals to (n+1)th stage.

4. A DS-CDMA multiple user serial interference canceler unit provided with 1st to Nth (N: natural number $\geq 2$) stages comprising:

K (K: natural number $\geq 1$) interference cancel units provided at each stage;

a first subtractor provided for each interference cancel unit at the second and subsequent stages that subtracts an interference replica signal output from an interference cancel unit of a present user at a previous stage from a sum of interference replica signals of a previous processing phase;

a second subtractor provided at an input side of each interference cancel unit at each stage exclusive of a first interference canceler unit at a first stage that subtracts an interference replica signal output from an interference cancel unit of a previous user or an interference replica signal output from said first subtractor from a received signal for outputting to said interference cancel unit; and an adder provided at an output side of each interference cancel unit at each stage exclusive of a first interference canceler unit at a first stage that adds an output of an interference cancel unit to a sum of interference replica signals of a previous processing phase.

5. The DS-CDMA multiple user serial interference canceler unit of claim 4 further comprising a first transmission line for transmitting said sum of interference replica signals added by said adder to a next stage and a second transmission line for transmitting an interference replica signal from an interference cancel unit to a first subtractor at a next stage corresponding to said interference cancel unit.

6. The DS-CDMA multiple user serial interference canceler unit of claim 5, wherein each of said first and said second transmission lines is medium means allowing for high rate transmission.

7. The DS-CDMA multiple user serial interference canceler unit of claim 6, wherein said first and said second transmission lines are formed by direct connection to parallel bus.

8. The DS-CDMA multiple user serial interference canceler unit of claim 6, wherein said first and said second transmission lines are formed by direct connection to serial bus.

9. The DS-CDMA multiple user serial interference canceler unit of claim 6, wherein said first and said second transmission lines are formed of optical fiber cable.

10. The DS-CDMA multiple user serial interference canceler unit of claim 6, wherein said first and said second transmission lines are formed of twisted wiring.

11. A method of transmitting an interference replica signal of a DS-CDMA multiple user serial interference canceler unit provided with 1st to Nth stages (N: natural number $\geq 2$) each provided with K units (K: natural number $\geq 1$) of interference replica signal generation means for generating an interference replica signal based on a received signal at each stage comprising steps of:

transmitting a signal S' obtained by subtracting a sum of interference replica signals at nth stage from a received signal to (n+1)th stage from a kth user at said nth ($1 \leq n \leq N$) stage;

transmitting an interference replica signal generated by each interference replica signal generation means at said nth stage to a corresponding user at said (n+1)th stage;

generating a signal S by adding said interference replica signal transmitted from kth user at said nth stage to a signal S' transmitted from (k−1)th user at said (n+1)th stage in said kth ($1 \leq k \leq K$) user at said (n+1)th stage and further generating an interference replica signal by interference replica signal generation means based on said signal S; and generating a signal S' by subtracting said generated interference replica signal from said signal S in kth ($1 \leq k \leq K$) user at said (n+1)th stage and transmitting said generated signal S' to (k+1)th user at said (n+1)th stage.

12. The method of transmitting an interference replica signal of claim 11, wherein each user at Nth stage comprises a step of decoding a received signal.

13. A DS-CDMA multiple user serial interference canceler unit comprising 1st to Nth (N: natural number $\geq 2$) stages each provided with K units (K: natural number $\geq 1$) of interference replica signal generation means for generating an interference replica signal from a received signal, each of said interference replica signal generation means is connected to a receive signal delay holder memory for delaying and holding said receive signal during generation of said interference replica signal, wherein:

said 1st to said kth units of interference replica signal generation means are connected in series;

a signal obtained by subtracting a sum of an interference replica signal generated by kth interference replica signal generation means as one of said K units of interference replica signal generation means and interference replica signals generated by (k−1)th unit of interference replica signal generation means from a received signal is transmitted to a next user;

a signal obtained by subtracting a sum of interference replica signals generated by each interference replica signal generation means from a received signal is transmitted from last interference replica signal generation means at a present stage to a next stage;

an interference replica signal generated by said interference replica signal generation means at (n−1)th stage is transferred to a next user at a next stage;

a signal obtained by adding an interference replica signal generated by interference replica signal generation means of a next user at a previous stage corresponding to said user to a synthesized signal as a sum of a signal output from last processing phase at a previous stage and an interference replica signal generated by each interference replica signal generation means up to a previous user at a present stage is input to kth interference replica signal generation means at present stage as a second and subsequent stages; and a signal obtained by subtracting an interference replica signal generated by interference replica signal generation means of a present user from said input signal is transferred to a latter processing phase.

14. The DS-CDMA multiple user serial interference canceler unit of claim 13, wherein each of said interference replica signal generation means at said each stage is connected in series and provided with a subtractor.

15. The DS-CDMA multiple user serial interference canceler unit of claim 13, wherein an adder is connected between an output side of each of said interference replica signal generation means at each stage and an input side of each interference replica signal generation means at a next stage each corresponding to each interference replica signal generation means of a present user at a previous stage via an interference replica signal delay holder memory for delaying and holding an interference replica signal output from each interference cancel unit of said present user at a previous stage.

16. A DS-CDMA multiple user serial interference canceler unit provided with 1st to Nth (N: natural number $\geq 2$) stages comprising a first transmission line on which a signal obtained by subtracting a sum of each interference replica signal at 1 stage from a received signal is transmitted from nth ($1 \leq n \leq N$) stage to (n+1)th stage;

a kth user at a first stage comprising interference replica signal generation means for generating an interference replica signal; and a subtractor provided at an output side of said interference replica signal generation means and outputs a signal obtained by subtracting an interference replica signal generated by said interference replica signal generation means from a signal obtained by subtracting a sum of each interference replica signal up to previous users from a received signal to interference replica signal generation means of (k+1)th user;

a kth user at nth ($1 \leq n \leq N$) stage comprising interference replica signal generation means for generating an interference replica signal; a second transmission line on which an interference replica signal generated by interference replica signal generation means of kth user at (n-1)th stage is transmitted; adder means for adding an interference replica signal transmitted on said second transmission line to a signal obtained by subtracting a sum of each interference replica signal at 1 stage from a received signal; and a subtractor for outputting a signal obtained by subtracting an interference replica signal generated by said interference replica signal generation means from an output of said adder means to interference replica signal generation means of (k+1)th user.

17. The DS-CDMA multiple user serial interference canceler unit of claim 16, wherein said interference replica signal generation means at each stage is connected in series.

18. The DS-CDMA multiple user serial interference canceler unit of claim 16, wherein a user at each stage comprises delay means for delaying and outputting a signal transmitted from a previous processing phase during generation of an interference replica signal by said interference replica signal generation means to a subtractor.

19. The DS-CDMA multiple user serial interference canceler unit of claim 16 comprising delay means for delaying an interference replica signal generated by interference replica signal generation means of kth user at (n-1)th stage.

* * * * *